Dec. 7, 1926.

A. A. BAYER

ARTIFICIAL BAIT

Filed Nov. 6, 1925

1,609,855

Inventor
Albert A. Bayer
By
Attorneys

Witness
Erwin B. Ewing

Patented Dec. 7, 1926.

1,609,855

UNITED STATES PATENT OFFICE.

ALBERT A. BAYER, OF MILWAUKEE, WISCONSIN.

ARTIFICIAL BAIT.

Application filed November 6, 1925. Serial No. 67,257.

This invention relates to artificial bait.

Objects of this invention are to provide an artificial bait of novel construction which may be drawn through the water and will have a life-like motion back and forth, and which will also have a periodic diving motion.

Further objects are to provide an artificial bait which may be very cheaply and simply constructed although it has the desirable characteristics enumerated above.

An embodiment of the invention is shown in the accompanying drawings, in which:—

Figure 1:
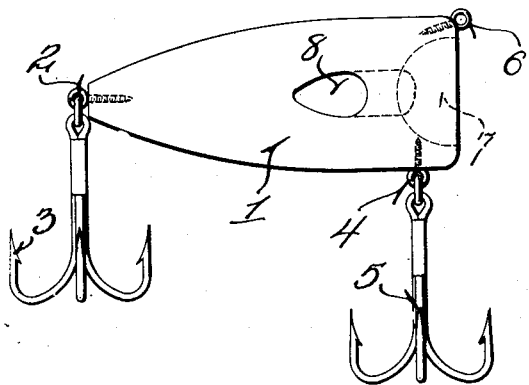
Figure 1 is a side elevation of the bait.

Referring to the drawings it will be seen that the bait comprises a body portion 1 which is cylindrical adjacent its forward end, and which has a tapered rear end, the tapered rear end being provided with a screw eye 2 to which a multiple hook 3 is attached. Adjacent the forward under side of the body portion, a screw eye 4 is positioned and supports a second multiple hook 5. The upper forward portion of the bait is provided with a screw eye 6 to which the line may be attached.

The body portion is preferably formed of buoyant material such as wood, for instance, although other material may be used, and the weight of the bait including the hooks and fittings is such as to cause it to ride below the water level.

Figure 2:
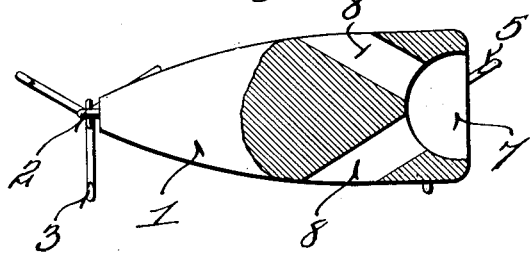
Figure 2 is a plan view partly in section.
Figure 3:
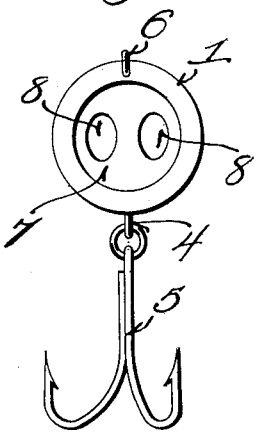
Figure 3 is a front end view of the bait.

The forward end of the bait is provided with a cavity 7 having a spherical inner surface. This cavity opens laterally into two angularly disposed discharge channels 8. These channels are symmetrically arranged with reference to a vertical plane through the center of the body portion, as may be seen from Figure 2.

In using this bait, the line is attached to the screw eye 6 and the bait is drawn through the water at a uniform rate. During this motion through the water, it will be readily appreciated that the water pockets within the cavity 7 and that this water discharges through the channels 8. It has been found that the discharging water and the peculiarly shaped cavity 7 cause the bait to wobble sidewise in a life-like manner probably due to the unequal or irregular flow of water through the discharge channels. At any rate, in actual practice, the bait has this sinuous lateral motion.

Further it has been found that the cavity 7 pockets the water at the front of the bait, obstructs its free travel through the water and causes it to periodically dive so as to give it an up and down motion. It has been found, further, that this composite motion of the bait may be secured at relatively low speeds of travel through the water.

It will be seen that an artificial bait has been provided which is of very simple construction and which simulates the motion of a live bait.

Although the invention has been described in considerable detail, it is to be understood that the invention may be variously embodied and is, therefore, to be limited only as claimed.

I claim:

An artificial bait comprising a body portion having a cylindrical forward end, and having a tapered rear end, a hook secured to the under side of the body portion adjacent its forward end, a hook secured adjacent the rear end of said body portion, a line receiving eyelet secured adjacent the forward upper end of said body portion, said body portion having a rounded centrally located outwardly opening cavity in its forward end and having a pair of identical horizontally extending diverging discharge channels communicating with said cavity, said channels opening outwardly through the body portion in the horizontal central plane.

In testimony that I claim the foregoing I have hereunto set my hand at Milwaukee, in the county of Milwaukee and State of Wisconsin.

ALBERT A. BAYER.